(No Model.) 2 Sheets—Sheet 1.
W. L. VAN HARLINGEN, Sr., & W. L. VAN HARLINGEN, Jr.
HEATING PIPE CONNECTION BETWEEN CARS.
No. 372,947. Patented Nov. 8, 1887.
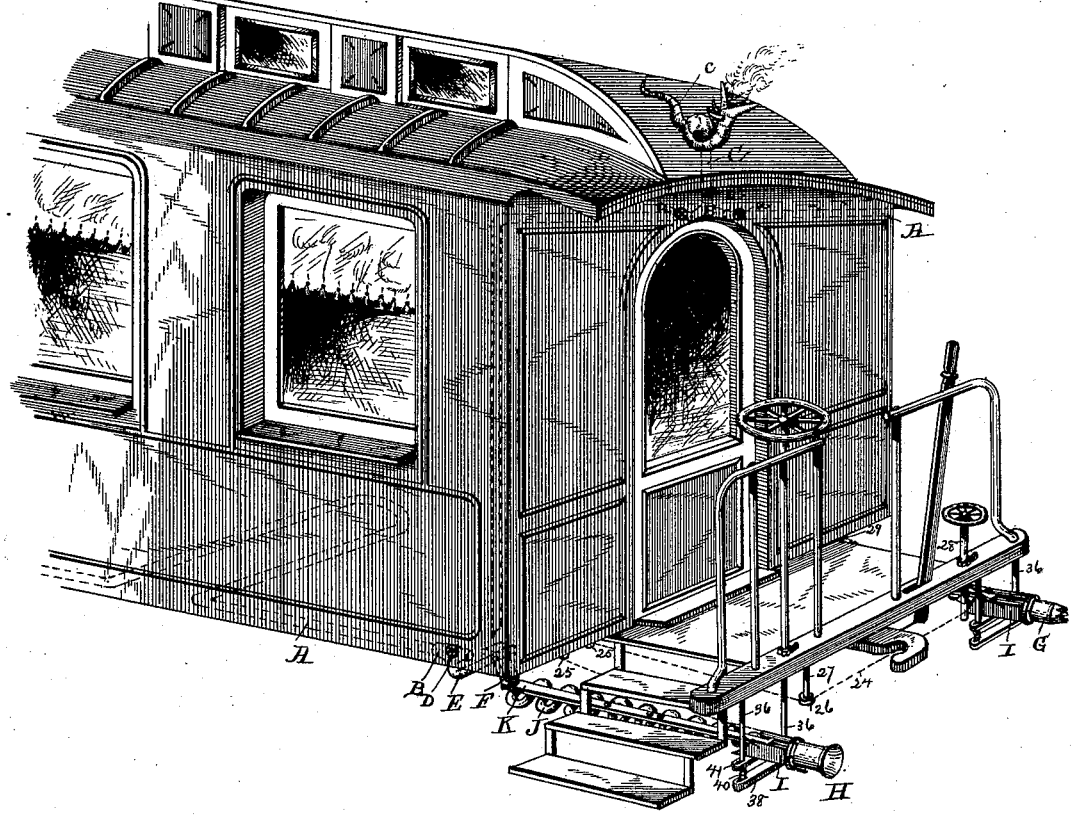
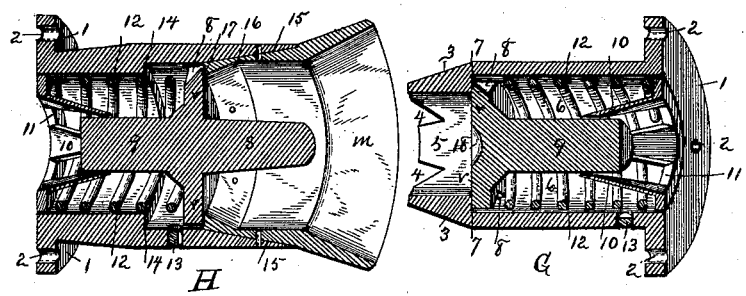

(No Model.) 2 Sheets—Sheet 2.
W. L. VAN HARLINGEN, Sr., & W. L. VAN HARLINGEN, Jr.
HEATING PIPE CONNECTION BETWEEN CARS.
No. 372,947. Patented Nov. 8, 1887.
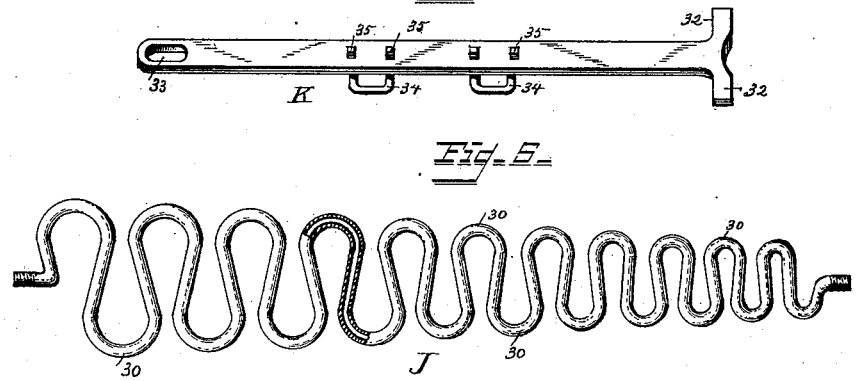
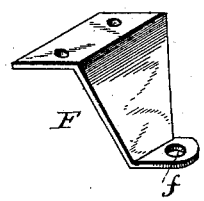
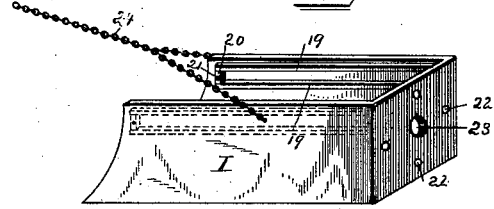
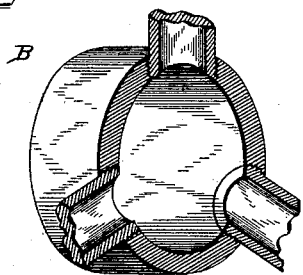
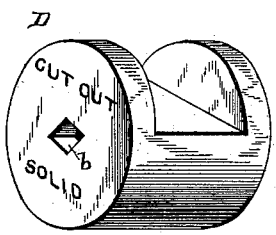
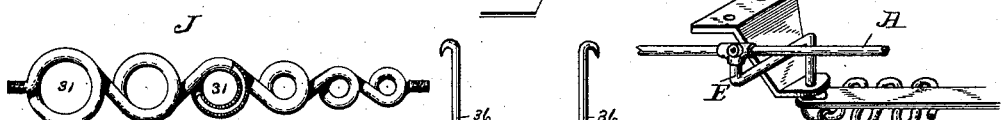
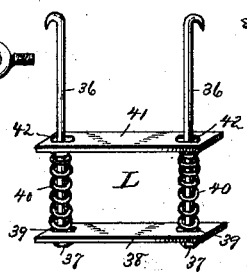
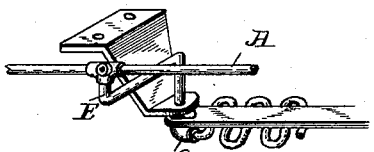

UNITED STATES PATENT OFFICE.

WILLIAM L. VAN HARLINGEN, SR., AND WILLIAM L. VAN HARLINGEN, JR., OF SAN FRANCISCO, CALIFORNIA.

HEATING-PIPE CONNECTION BETWEEN CARS.

SPECIFICATION forming part of Letters Patent No. 372,947, dated November 8, 1887.

Application filed June 2, 1887. Serial No. 240,076. (No model.)

*To all whom it may concern:*

Be it known that we, WILLIAM L. VAN HARLINGEN, Sr., and WILLIAM L. VAN HARLINGEN, Jr., citizens of the United States of America, residing at San Francisco, in the county of San Francisco and State of California, have invented certain new and useful Improvements in Heating-Pipe Connections Between Cars, of which the following is a specification, reference being had therein to the accompanying drawings.

Our invention relates to heating-pipe connections between railroad-cars; and it has for its object to provide means for conveying hot air or steam through all the cars of a train for the purpose of heating them, the construction and arrangement of the pipes and pipe-couplings and their appendages being such that communication between the pipes of the cars may be established by the simple act of bringing the cars together, when the pipe-couplings will be held in contact with each other by spring-pressure alone, no hooks, levers, or other devices being employed to secure them together; and, furthermore, when the cars are separated, the valves in each coupling will automatically close and shut off the flow of the heating agent.

The invention will first be described in connection with the accompanying drawings, and then pointed out in the claims.

Figure 1 is a perspective view of so much of a car-body and its appliances as are necessary to illustrate our invention. Figs. 2 and 3 are sectional perspective views of the female and male pipe-couplings, respectively. Fig. 4 is a perspective view of the supporting-bar for the propelling-spring conducting-pipe. Fig. 5 is a plan view of the propelling-spring conducting-pipe, partly broken out. Fig. 6 is a perspective view of the sliding box. Fig. 7 is a perspective view of the bracket for bracing the vertical pipe to which one end of the propelling-spring conducting-pipe is connected. Fig. 8 is a perspective view of the spring-seat for the sliding box. Fig. 9 is a perspective view of the three-way joint, the pipes of which are in section; and Fig. 10 is a perspective view of the valve for the same. Fig. 11 is a plan view of a modified form of propelling-spring conducting-pipe. Fig. 12 is a detail view of the bracket, the conducting-pipe, the connecting-pipe, and the supporting-bar, showing how they are connected.

Referring to the accompanying drawings, A represents the main pipes, (only one of which is shown in the drawings,) which extend along the sides of the car, inside, near the floor, with a return-bend under each seat, in the usual manner. At each end of the car these pipes are bent upward to near the roof, thence across to the center of the car, where their ends connect with a three-way joint, B, to which is also connected a vertical escape-pipe, C, bearing upon its upper end any suitable ornamental figure, as a dragon, c, the pipes A and C being provided with ordinary valves, a a'.

In each main pipe A, near each end of the car, is inserted another three-way joint, precisely similar to joint B, into which is fitted a valve, D, of the form shown in Fig. 10, which has a square socket, b, formed in its outer end for the reception of a suitable operating-key, the socketed end of the valve extending outward flush with the outer side of the car, so as to be readily accessible.

E represents a connecting-pipe for connecting the main pipe A with the propelling-spring conducting-pipe, hereinafter described. This connecting-pipe E, which is bent at one end, so as to connect with one arm of the three-way joint B, extends at right angles to the said joint to a point in line with the pipe-coupling, and is then bent downward, passing through a perforation, $f$, in a bracket, F, of the form shown in Figs. 7 and 12, secured to the under side of the car-body, thence through an elongated aperture in the supporting-bar, which will be presently described, and is secured to the propelling-spring conducting-pipe J by an elbow, $e$, as clearly shown in Fig. 12.

G and H are the pipe-couplings, of which the former is the male and the latter the female. The male pipe-coupling G is a round hollow casting of any suitable metal, having a base flange, 1, in which are formed bolt-holes 2. The forward end of this coupling is beveled, as seen at 3, and is notched, as seen at 4. The interior diameter of the greater portion of this coupling is greater than that of the mouth 5, in order to form a chamber, 6, for the valve and its operating mechanism, and consequently there is an offset on the line where the mouth opens into the chamber, which offset serves as a seat, 7, for the valve v. This valve is a casting of a diameter to neatly fit in the chamber 6, and has notches 8 in its periphery, these notches increasing in size from front to rear, as seen in Fig. 3. The valve has an integrally-formed guide-stem, 9, which extends rearwardly, and is guided by braces 10, attached to an annular ring, 11, at the rear end of chamber 6. One end of a coil-spring, 12, which encircles the guide-stem, rests against this ring, and its other end rests against the rear side of the valve. The coupling is provided with a cock, 13, for drawing off any condensation that may accumulate in the pipes.

H represents the female pipe-coupling, of sufficient interior diameter to admit the male coupling. The interior diameter is reduced, however, at 14, to form a shoulder for arresting the rearward movement of the valve, for a purpose hereinafter stated, and the forward end of this coupling is beveled outwardly on the inner side, as at 15, for the reception of a flaring mouth-piece, m, preferably of a softer material than the male coupling, the mouth-piece being beveled on its outer side to correspond with the bevel on the inner side of its coupling, and is secured in the coupling by rivets or in any other suitable manner. The inner diameter of the mouth-piece is gradually reduced from the point marked 16 to its inner end, 17, which end serves as a seat for the valve. This female coupling is provided with an annular ring, 11, carrying braces 10, a cock, 13, and a coil-spring, 12, all as described for the male coupling. The valve v is also of the same construction as the valve in the male coupling, except that it has a forwardly-extending operating-stem, s, which, together with guide-stem 9, is formed integral with the valve. The forward end of stem s is preferably rounded, in order to enter a concavity, 18, in the front face of the valve in the main pipe-coupling when the two couplings are brought together.

I represents a metal sliding box open at the top and at one end and of the general shape shown in Fig. 6. This box is provided along its sides, inside, near the top, with guideways 19, the inner end of each of which is closed by a removable stop, 20, secured in place by a thumb-screw, 21. The outer end plate of the box has bolt-holes 22 formed in it for the attachment of the pipe-coupling, and in the center of said plate there is a screw-threaded opening, 23, into which is secured the outer end of the propelling-spring conducting-pipe J. To the rear end of this box is attached a chain, 24, which extends rearward and passes around two pulleys, 25, secured to the under side of the end of the car-body, one of which is in direct line with the sliding box I, thence forward to a pulley, 26, journaled on a rod, 27, attached to the under side of the platform-beam, thence across the car, underneath the car-coupling, to a winding-shaft, 28, to which it is secured, the winding-shaft passing through the platform-beam and provided with the usual hand-wheel and pawl and ratchet. Another chain, 24, passes rearward from the sliding box on the opposite side of the car and passes around a pulley, 29, in line with the box, thence forward to the winding-shaft 28, to which it is secured.

J represents the propelling-spring conducting-pipe for conducting the steam or hot air from the main pipe A and through the connecting-pipe E to the pipe-coupling, and also for propelling the pipe-coupling forward to make and preserve a close joint with the pipe-coupling on the opposite car. This propelling-spring conducting-pipe is constructed of a steel, brass, or other suitable elastic metal tube bent, preferably, into serpentine form and tapering gradually toward its front end, the bends 30 of the pipe lying in a horizontal plane, and each end of the pipe being screw-threaded. We do not wish, however, to limit ourselves to this precise construction of the propelling-spring conducting-pipe, for it may be made in other forms and still be within the scope of our invention. For instance, the metal tube may be bent into a series of rings, 31, diminishing in size toward the outer end, and all the rings lying in a horizontal plane, as shown in Fig. 11. As before stated, one end (the inner) of the propelling-spring conducting-pipe is connected to the connecting-pipe E and its front end is screwed into the opening 23 in the sliding box.

K represents a metal bar for supporting the propelling-spring conducting-pipe. One end (the outer) of this bar has laterally-projecting arms 32, and in the other end is formed an elongated slot, 33, of a width somewhat greater than the diameter of the connecting-pipe E. At suitable intervals the bar K is provided with metal loops 34, whose ends are screw-threaded and pass through the bar, and are secured by nuts 35, the loops having each been first passed up from the under side of and between the bends of the propelling-spring conducting-pipe J, so that the pipe will lie in the loops, by which means said pipe is supported from sagging. The outer end of this bar is connected with the sliding box I, the arms 32 fitting loosely in the guideways 19, into which the said arms are inserted by first removing stops 20 and then replacing them, and the inner end of the bar is loosely connected with the connecting-pipe E under the bracket F by first putting said pipe through the perforation f in the bracket and then through the elongated slot 33 in the bar, the lower end of pipe E extending far enough below the bar to permit of the attachment to it of the propelling-spring conducting-pipe J, a little space being left between the bar and the bracket to allow of slight vertical play of the former, as seen in Fig. 12.

L represents a spring-seat for the sliding box I. It consists of two rods, 36, each hooked at the upper end and provided at the lower end with a head, 37. A metal plate, 38, having an elongated hole, 39, at each end, rests on the heads 37 of the rods, and above this plate, encircling each rod, is a spiral spring, 40, on the upper ends of which rests another plate, 41, having elongated holes 42, similar to those in plate 38. These rods are hooked into rings (not seen) secured to the under side of the platform-beam.

It is to be understood that there is to be a male pipe-coupling on one side of the car and a female pipe-coupling on the other side at each end, the male coupling on one end being opposite the female coupling at the other end.

The operation is as follows: While the cars are out of use the pipe-couplings should be drawn in under the platforms by means of the winding-shafts and chains, thus compressing the propelling-spring conducting-pipes, and kept there until the cars are coupled in the train. When the cars have been coupled, the pawls are disengaged from the ratchets on the winding-shafts on the abutting cars, when the propelling-spring conducting-pipe will expand somewhat and force the pipe-couplings together. The male coupling will enter the female coupling until the valve-stem of the latter strikes the valve-face of the former, (when said stem will be centrally directed by the concavity in the valve-face of the male pipe-coupling,) and as the pipe-couplings continue to move toward each other their valves will be simultaneously and evenly opened, (assuming of course that the springs in both couplings are of the same strength,) the forward end of the male coupling resting against the face of the valve in the female coupling when the valves are at full throw. The current of hot air or steam will then flow through the notches 8 in the periphery of the valve in the female coupling and the notches 4 in the end of the male coupling and the notches 8 in the periphery of the valve of the male coupling, or vice versa. If the valves in the two pipe-couplings open evenly, the telescopic movement of the male and female couplings will be arrested by the beveled end of the former impinging against the beveled inner portion of the latter by the time the valves are at full throw. On the other hand, should the spring in the male coupling be so strong as to hold its valve closed, and at the same time overcome the spring in the female coupling, the impinging-point of the two couplings will not be reached until after the valve in the female coupling shall have been forced back against the shoulder 14 in that coupling, and as the propelling-spring conducting-pipes J continue to force the pipe-couplings together until said impinging-point is reached, the spring in the male coupling will in the meantime be compressed and the valve opened.

When the cars are in motion and while they are oscillating laterally and vertically with relation to each other, the pipe-couplings will maintain the same axial relation one to the other, owing to the fact that the propelling-spring conducting-pipes constantly exert a pressure against the male and female couplings, tending to force them tightly together in whatever position they may be. The propelling-spring conducting-pipes being flexible, and the bars K supporting them being loosely attached to pipe E, it is clear that these parts themselves will freely conform to the line assumed by the pipe-couplings, and thus permit the latter to move in unison. The spring-seats L also play a part in holding the pipe-couplings in direct alignment one with the other, for as said couplings are bolted to the sliding boxes I, and these boxes rest upon plate 41 of the spring-seat and bear indirectly upon the plate 38, these plates will maintain their original positions, owing to the weight upon them, while their supporting-rods 36, hooked to the under side of the platform-beam, play back and forth freely in the elongated holes 39 and 41 in the lower and upper plates, respectively, thus preventing the boxes and couplings from partaking of the swing of the cars.

In another pending application for Letters Patent of the United States for improvement in heating-pipe connections between cars, filed May 31, 1887, we have described and shown, but have not claimed, a system of main pipes similar to the system of main pipes shown and described in this application. This arrangement of pipes is not herein claimed, as we reserve it as the subject-matter of another application to be filed by us.

In the aforesaid application filed May 31, 1887, we have also shown, described, and claimed spring-seats for supporting the sliding boxes, chains attached to said boxes, a system of pulleys over which the chains pass, and a winding-shaft to which the chains are also attached. None of these are claimed herein, except in specific combinations.

What we claim as new, and desire to secure by Letters Patent, is—

1. The combination, with the main pipes, the male and female pipe-couplings, the sliding boxes to which said couplings are secured, and the spring-seats for supporting said boxes, of the propelling-spring conducting-pipes whose outer ends are secured in said boxes and communicating with the pipe-couplings, and suitable means for connecting said pipes with the main pipes, all constructed and arranged substantially as described.

2. The combination, with the main pipes, the male and female pipe-couplings, the sliding boxes to which said couplings are secured, and the spring-seats for supporting said boxes, of serpentine propelling-spring conducting-pipes, the bends of which lie in a horizontal plane and whose outer ends are secured in said boxes and communicate with the pipe-couplings, and suitable means for connecting the conducting-pipes with the main pipes, substantially as described, and for the purposes stated.

3. The combination, with the male and female pipe-couplings, the sliding boxes to which said couplings are secured, the propelling-spring conducting-pipes whose outer ends are secured in said boxes and communicate with the pipe-couplings, and the main pipes, of the perforated brackets and the connecting-pipes, one end of the latter connected with the main pipes and the other end passed through the perforation in the brackets and connected with the propelling-spring conducting-pipes, all constructed and arranged substantially as described.

4. The combination, with the connecting-pipe, the perforated bracket, the sliding box, and the propelling-spring conducting-pipe, of the bar for supporting said conducting-pipe, said bar being provided with loops and loosely connected at one end to the connecting-pipe and at the other end to the sliding box, all constructed and arranged substantially as described.

In testimony whereof we affix our signatures in presence of two witnesses.

WILLIAM L. VAN HARLINGEN, SR.
WILLIAM L. VAN HARLINGEN, JR.

Witnesses:
WM. H. MYERS,
ALBERT SPEIDEN.